Oct. 13, 1959 R. B. SLADEK 2,908,763

TELEPHONE SYSTEMS

Filed Oct. 17, 1955 3 Sheets-Sheet 1

INVENTOR
R. B. SLADEK
C. B. Hamilton
ATTORNEY

TELEPHONE SYSTEMS

Filed Oct. 17, 1955 3 Sheets-Sheet 2

INVENTOR
R. B. SLADEK
C. B. Hamilton
ATTORNEY

INVENTOR
R. B. SLADEK
BY C. B. Hamilton
ATTORNEY

United States Patent Office 2,908,763
Patented Oct. 13, 1959

2,908,763

TELEPHONE SYSTEMS

Robert B. Sladek, Cicero, Ill., assignor to Western Electric Company, Incorporated, New York, N.Y., a corporation of New York Application October 17, 1955, Serial No. 540,929
19 Claims. (Cl. 179—18)

This invention relates to telephone systems, and more particularly to step-by-step telephone systems.

Various step-by-step systems for double-hunting have been proposed in the past. However, in each of these systems, wiper switching relay action occurs after completion of the effective rotary step, which necessitates retarding the stepping speed of the rotary switch so as to prevent the rotary action from stepping the wipers off the desired terminals before operation of the wiper switching relay is completed. This requires a general slowing down of the rotary speed of the rotary switch and sometimes causes mutilation of the dialed digits under heavy traffic conditions due to the switch being unable to reach further trunks in the level prior to release of the dial for the succeeding digit by the calling subscriber.

An object of the invention is to provide telephone systems having double-hunting step-by-step switches.

Another object of the invention is to provide telephone systems having double-hunting step-by-step switches provided with pretesting wiper springs.

A further object of the invention is to provide telephone systems including step-by-step switches which simultaneously at high speed hunt along two groups of trunks.

A further object of the invention is to provide telephone systems having step-by-step switches wherein wiper switching relays are permitted to operate during the last rotary step prior to the arrival of wipers onto a trunk to be selected to permit high speed rotary action.

A telephone system illustrating certain features of the invention may include a switch having a first group of outgoing trunk terminals and a second group of outgoing trunk terminals. Two groups of wipers, one for each group of terminals, may be stepped along the groups of terminals with one group of wipers one position ahead of the other, and a pretest wiper may be moved along with the advance group of wipers to pretest the terminals for the other group of wipers, and the groups of wipers alternately test and seize idle terminals.

A complete understanding of the invention may be obtained from the following detailed description of a telephone system forming a specific embodiment thereof, when read in conjunction with the appended drawings, in which Figs. 1 and 2 form a diagrammatic view of a portion of a telephone system forming one embodiment of the invention;

Figure 1:
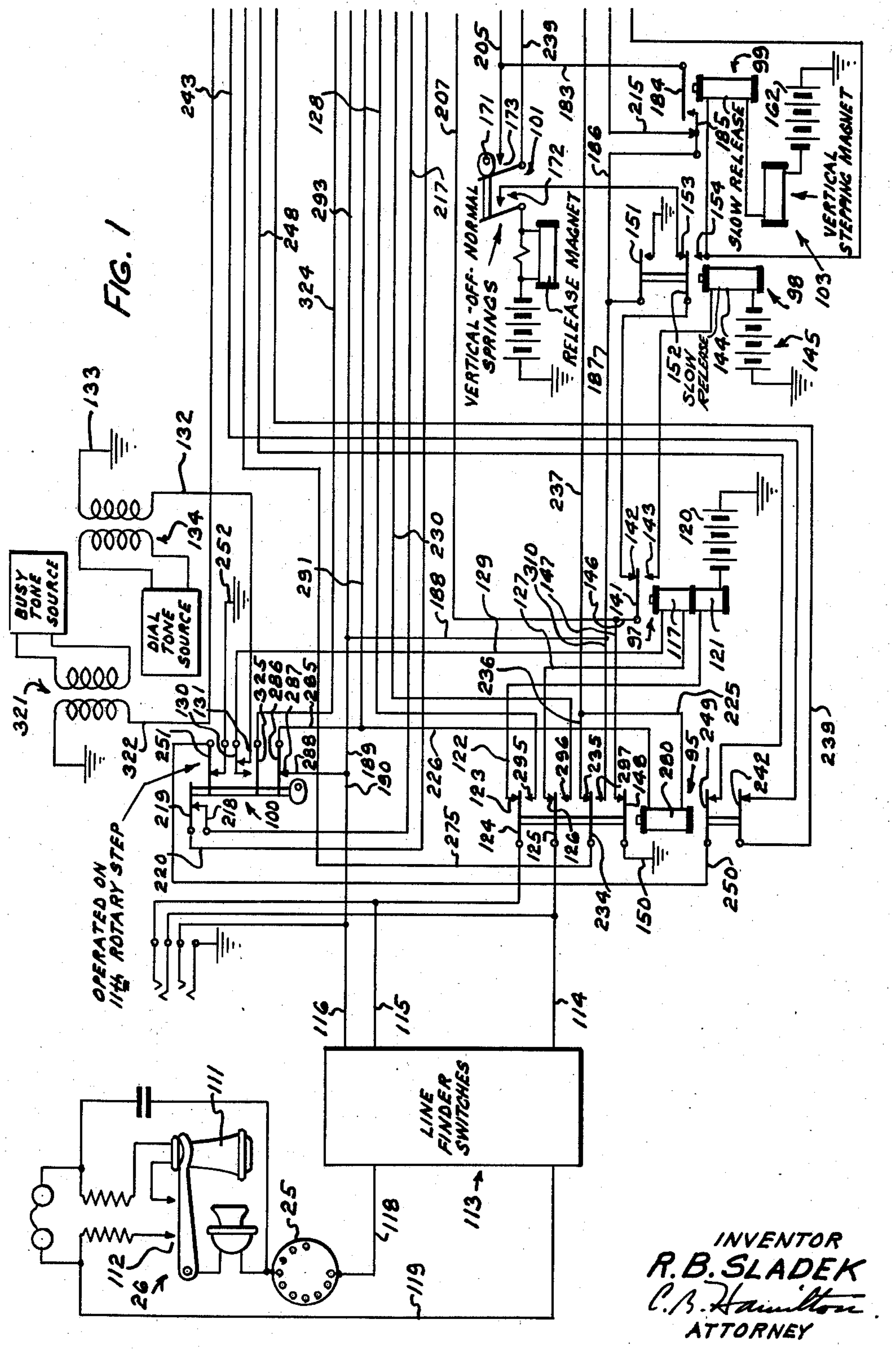
Figure 2:
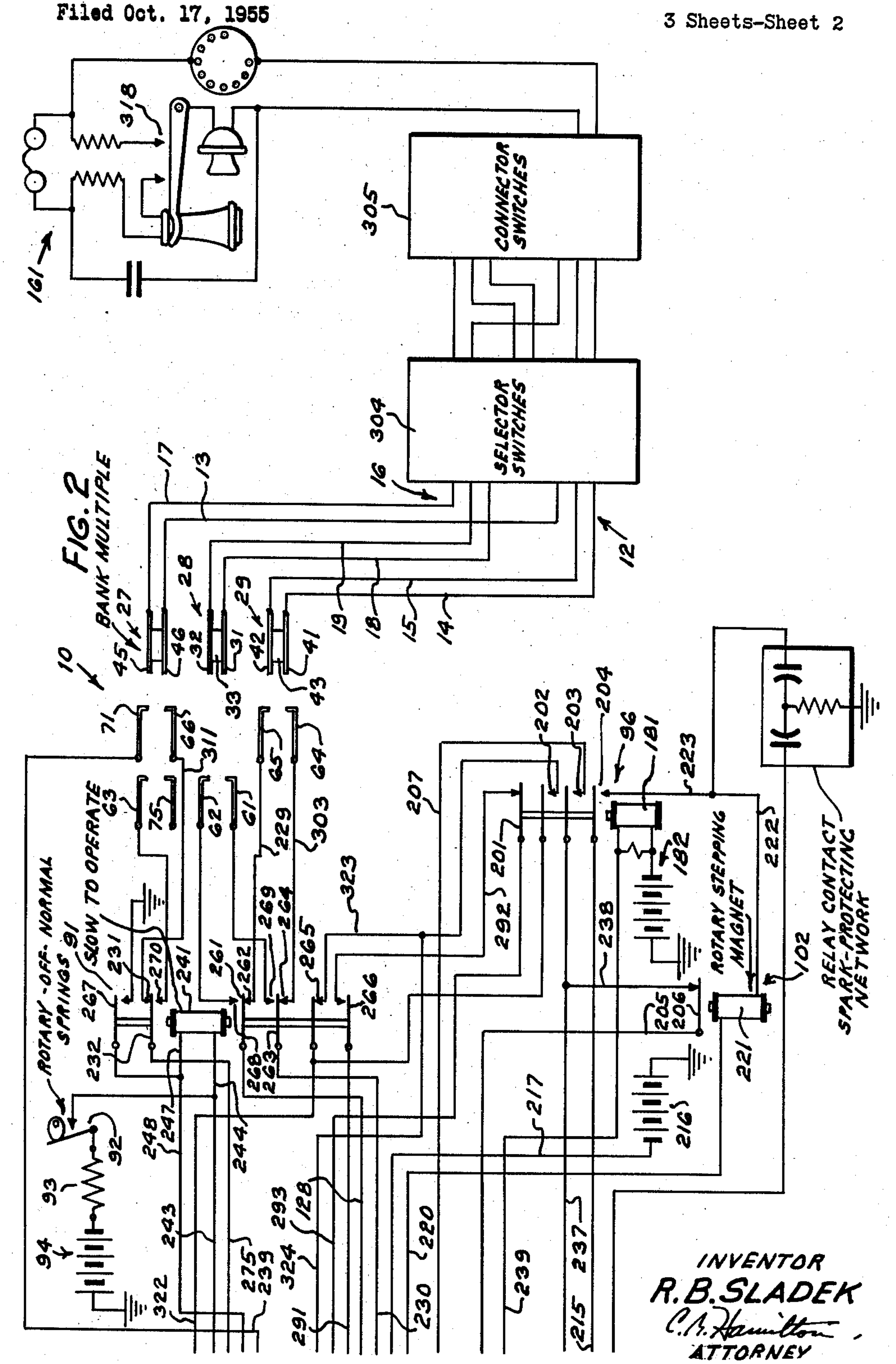
Figure 3:
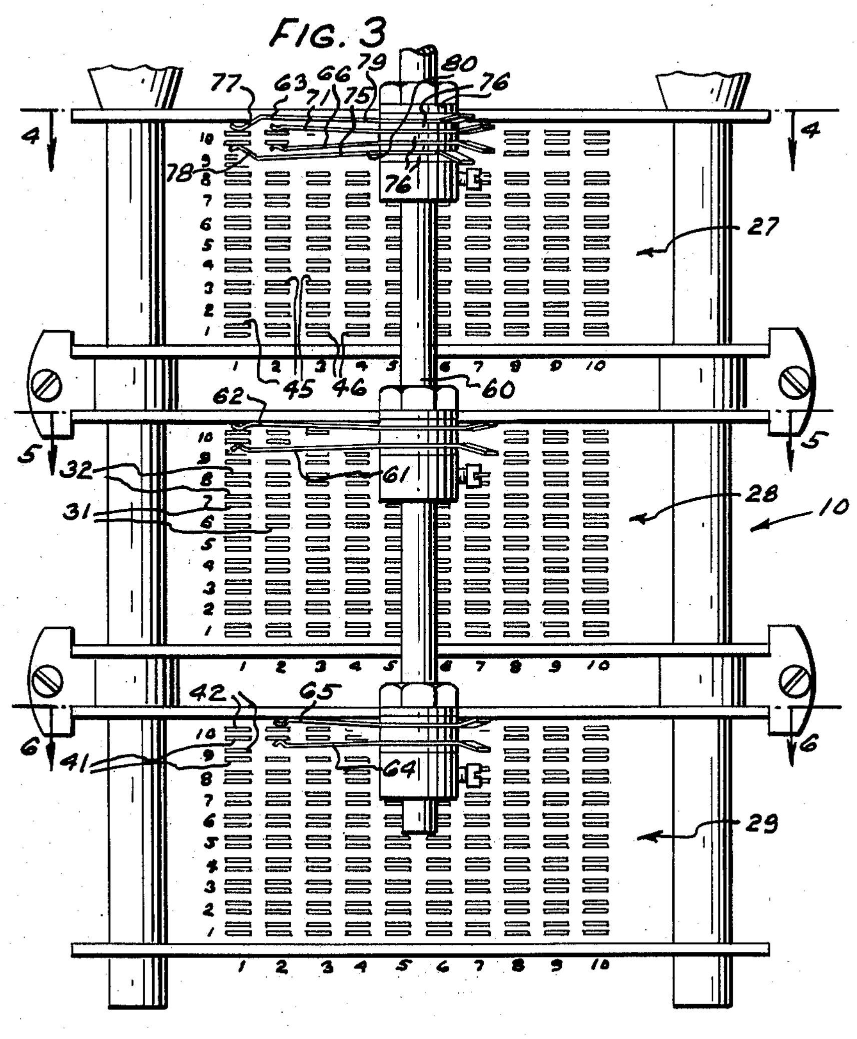
Fig. 3 is a fragmentary, front elevation of a portion of the switch shown in Fig.1.
Figures 4, 5, 6:
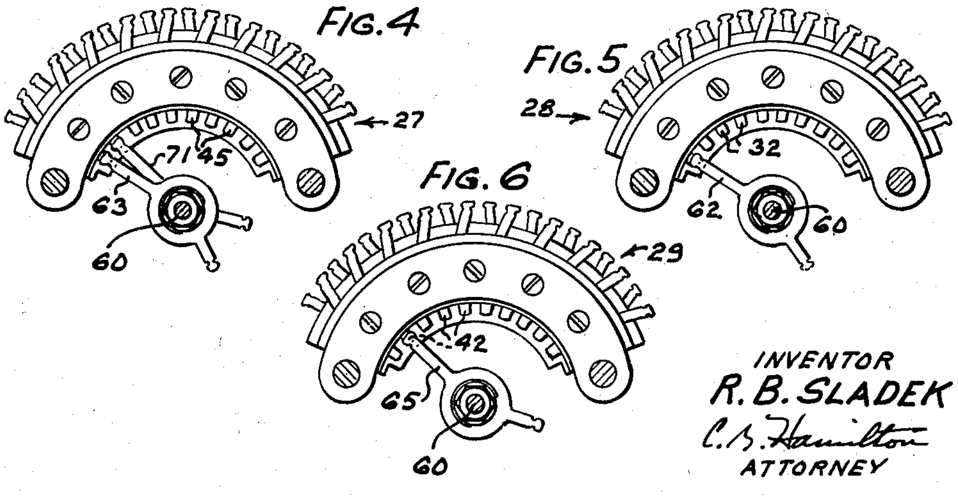
Fig. 4 is a horizontal section taken along line 4—4 of Fig. 3.
Fig. 5 is a horizontal section taken along line 5—5 of Fig. 3.
Fig. 6 is a horizontal section taken along line 6—6 of Fig. 3.

Referring now in detail to the drawings, there is shown therein a telephone system having a double-hunting step-by-step selector switch 10 applicable to step-by-step system dial telephone offices, Strowger system offices and other well known systems which are used in dial telephone offices. The switch 10 provides outgoing local and interoffice trunks with higher efficiency in traffic carrying capacity than hitherto known equipment. The switch hunts over a maximum number of trunks 12, each consisting of a sleeve conductor 13, a tip conductor 14 and ring conductor 15, and trunks 16, each consisting of a sleeve conductor 17, a tip conductor 18 and a ring conductor 19, in the critically limited period of time available for trunk hunting.

The switch 10, in the system shown, hunts over a maximum of twenty trunks within the minimum period of time between receipt of the last impulse of an effective digit from a dial 25 of a calling station 26 and the release of the finger wheel of the dial for the next successive digit of the number being called. This gives an increase in the load carrying capacity of each trunk outgoing from its banks 27, 28 and 29, since the load carrying capacity of a trunk in a group of twenty trunks is materially greater than that of a trunk in a group of ten trunks accessible to a hunting device in a single hunting trial due to the reduction of the idle time between calls while the trunk is waiting for reassignment. This results in a reduction of the total number of outgoing trunks required for a given traffic load with a savings in not only the quantity of trunks themselves but also in the associated apparatus such as terminating selectors and connectors in intra-office calls, out trunk switches, outgoing repeaters and incoming selectors in inter-office calls and trunk relay equipment and answering apparatus in special service, long distance operator and other service calls. The switch 10, with slight modifications is also suitable for use on the various types of digit-absorbing selectors.

The bank 28 has one hundred tip terminals 31 and one hundred ring terminals 32 insulated by insulating plates 33, each connected to a conductor of one hundred outgoing trunks. The bank 29 similarly is connected to a similar number of outgoing trunks 12 through one hundred tip terminals 41 and one hundred ring terminals 42 insulated from the tip terminals 41 by insulating plates or blocks 43. The bank 27 includes one hundred sleeve terminals 45 insulated from one hundred sleeve terminals 46, the terminals 45 being connected to sleeve conductors of one hundred trunks 16, and the terminals 46 being connected to the sleeve conductors of the hundred trunks 12.

The switch 10 includes a rotatable and vertically movable shaft 60 of a well known type on which are mounted wipers or wiper springs 61, 62 and 63 for contacting the terminals 31, 32 and 45, respectively, and wipers or wiper springs 64, 65 and 66 for contacting the terminals 41, 42 and 46, respectively. An advance or pretest wiper or wiper spring 71 located directly opposite to the spring 66, contacts each terminal 45 one horizontal or rotary step in advance of the wiper spring 63 during each trunk-hunting operation, and is always in the same rotary position as those of the wiper springs 64, 65 and 66. The spring 71 also is one terminal in advance of the wiper springs 61 and 62, which are always in the same rotary position as the spring 63, and a dead wiper spring 75 which is provided only to mechanically balance the spring 63. The springs 63 and 75 bracket the springs 66 and 71, are insulated from the latter springs by conventional insulating washers 76 and have neck portions 77 and 78 offset from shank portions 79 and 80 which are spaced from the wiper springs 71 and 66. The wipers 64, 65 and 66 serve one hundred trunks 12 in the lower bank 29 and the sleeve conductors 13. The wiper 71 will serve as an advance test for the wipers 61, 62 and 63, which are set on the switch shaft in positions equivalent of one rotary step behind or lagging that of the wipers 64, 65, 66 and 71. In other words, when the wipers 64, 65, 66 and 71 are resting on the second or number two set of bank terminals in a level after two rotary steps, the wipers 61, 62 and 63 rest on the first or number one set of bank terminals.

There also is provided a relay 91, rotary-off-normal springs 92, which are closed as soon as the first rotary step is made, a series resistance 93 and a grounded battery 94. Relays 95, 96, 97, 98 and 99 are mounted conventionally on the frame of the switch 10, which also has eleventh rotary step springs 100, vertical-off-normal springs 101, a rotary stepping magnet or relay 102 and a vertical stepping magnet or relay 103. The rotary stepping magnet 102 and the vertical stepping magnet are of well known construction and serve to step the shaft 60 by well known ratchet connections (not shown).

In the operation, a receiver or handset 111 is lifted to make a hook switch 112 of the calling station 26 connect the station 26 to a line finder 113. The line finder 113 is connected to switch 10, and thus extends a tip lead 114 and a ring lead 115 to the dial 25 and a sleeve lead 116 to the line finder 113 to hold it operated. The closed path through the dial contacts and station apparatus actuate the relay 97 through a grounded battery 120, a winding 121, a conductor 122, contacts 123 and 124 of the relay 95, the ring lead 115, a ring lead 118 of the station 26, the dial contacts, a tip lead 119 of the station 26, the tip lead 114, contacts 125 and 126 of the relay 95, a conductor 127, a second winding 117 of the relay 97, a conductor 129, contacts 130 and 131 and a conductor 132 connected to a grounded conductor 133 through a dial tone transformer 134 which gives a dial tone to the station 26. The windings 121 and 117 open contacts 141 and 142 and close contacts 141 and 143 to energize a winding 144 of the slow release relay 98 from a battery 145 grounded on one side through the contacts 143 and 141, conductors 146 and 147, contacts 148 of the relay 95 and a grounded conductor 150. The relay 98 pulls up to connect the sleeve lead 116 to ground through contacts 151 and conductors 187, 188, 189 and 190, and moves a contact 152 out of engagement with a contact 153 and into engagement with a contact 154.

The subscriber at the station 26 then dials the first digit of the number of a station 161 to be called, and the dial 25 breaks and makes its contacts to alternately deenergize and energize the relay 97, the relay 98 staying in operated condition since it is a slow release relay. On each deenergization of the relay 97, the relay 99 and vertical magnet 103 are energized from a battery 162 through the contacts 154, 152, 142, 141 and 148 to ground. On each energization of the relay 97, the magnet 103 drops out but the relay 99 is a slow release relay and stays operated. On each operation of the magnet 103, it raises the shaft 60 one contact level, eventually to the contact level corresponding to the digit dialed. On the first operation of the magnet 103, a cam 171 on the shaft 60 permits contacts 172 and 173 of the vertical-off-normal springs 101 to close. The contacts 173 complete an energizing circuit to a winding 181 from a grounded battery 182, the contacts 173, a conductor 183, contacts 184 and 185 of the relay 99 and conductor 186 to the grounded contact 151 of the operated relay 98. The relay 96 opens contacts 201 and closes contacts 202, 203 and 204. The contacts 203 lock in the relay 96 through the contacts 173, conductor 205, contacts 206, the contacts 203, conductors 207 and 147 and the contacts 148.

On each succeeding impulse from the first digit dialed, the relay 97 is deenergized and energized to keep the relays 99 and 98, respectively, energized and to energize and deenergize the vertical stepping magnet 103. At the end of the dial impulses of the first digit, the dial contacts reclose so that the relay 97 is energized to deenergize the relay 99 and magnet 103 which drop out. The contacts 184 and 185 open and contacts 185 and 215 close to energize the rotary stepping magnet 102, through a grounded battery 216, a conductor 217, contacts 218 and 219 of the springs 100, a conductor 220, a winding 221, conductors 222 and 223, the contacts 204 and 185, conductor 186 and contact 151 to ground. The magnet 102 opens the contacts 206 to deenergize the relay 96 and also steps the wiper springs 64, 65, 66 and 71 to the first terminals of the level of the banks to which the wiper springs have been stepped. Opening of the contacts 206 of the magnet 102 drops out the relay 96, which in turn, opens the contacts 204 to drop out the rotary stepping magnet 102.

If the first terminals 41, 42 and 46 connected to the first trunk 12 are not busy, the conductor 13 and the contact 46 are not at ground potential and there is no ground from the sleeve wiper spring 66 and the contact 46 to the bottom end of a winding 280 of the relay 95. This causes energization of the relay winding 280 from the battery 182 through the winding 181 of the relay 96, a conductor 239, the contacts 173 of the vertical-off-normal springs 101, the conductor 205, the contacts 206, conductors 238, 237 and 225, the winding 280, conductors 226, 285, contacts 286 and 287 of the springs 100, conductors 288, 189, 188 and 187 and contact 151 of the relay 98 to ground. The winding 280 is a high ampere-turn winding while the winding 181 of the relay 96 is a low ampere-turn winding so that the relay 95 is actuated at this time while the relay 96 is not energized sufficiently to pull up. The relay 95 then makes contacts 124 and 295 to connect the ring conductor 115 to the ring conductor 15 through the contacts 124 and 295, a conductor 128, contacts 268 and 262, a conductor 229, the ring wiper spring 65 and the ring terminal 42. The relay 95 also makes contacts 125 and 296 to connect the tip conductor 114 to the tip conductor 14 through the contacts 125 and 296, a conductor 230, contacts 269 and 264 of the relay 91, a conductor 303, the tip wiper spring 64 and the tip terminal 41. The first trunk 12 connects the subscribers station 26 to successive selector groups 304, which operate in the same manner as the selector switch 10 to connect the station 26 to a connector switch 305, which connects the station 26 to the station 161, all upon further dialing, of course. The sleeve conductor 116 is connected to the sleeve conductor 13 through conductors 190, 189, 188 and 310, contacts 297 and 234 of the relay 95, a conductor 275, contacts 232 and 231 of relay 91, a conductor 311, wiper spring 66 and terminal 46 to hold the line finder equipment operated from a holding ground from succeeding switches in the train to the sleeve terminal 46. This holding ground also holds relay 95 energized, for the duration of the call, from battery 182 through winding 181 of relay 96, a conductor 239, contacts 173 of springs 101, conductor 205, contacts 206, conductors 238, 237 and 225, winding 280, conductors 226 and 285, contacts 286 and 287 of springs 100, conductors 288, 189, 188 and 310, contacts 297 and 234 of relay 95, a conductor 275, contacts 232 and 231 of relay 91, a conductor 311, wiper spring 66 and terminal 46 to holding ground from the succeeding switches. When relay 95 is energized, its contacts 124 and 123 and contacts 125 and 126 are opened to deenergize relay 97, which opens its contacts 141 and 143 to deenergize relay 98. Contacts 234 and 235 of relay 95 are open to prevent further actuation of relay 96, thereby preventing operation of the rotary magnet 102, and contacts 148 of relay 95 are held open to set up the circuit to the release magnet. Contacts 242 of relay 95 are held open to isolate the pretest wiper 71 electrically so as not to disturb the trunk contacted by the wiper 71 during a call through the selector switch 10. When the switch hook 112 of the station 26 and a corresponding switch hook 318 of the station 161 are opened again the line finder 113 and the switches 10, 304 and 305 are dropped back to normal.

When the trunk 16 connected to the first or number one terminals 31, 32 and 45 of the level of the banks 27, 28 and 29 being contacted is busy, the advance test wiper 71 connects to ground a previously ungrounded side of a winding 241 of the slow-to-operate relay 91 through a conductor 239, contacts 242 of the relay 95 and conductors 243 and 244 to prevent the relay 91 from being operated by the rotary-off-normal springs 92 which closed on the first horizontal or rotary step to connect the winding to the battery 94 through the resistor 93, the other side of the winding 241 being grounded through conductors 247 and 248, contacts 249 of the relay 95, a conductor 250, contact 251 of the eleventh rotary step springs 100 and a grounded conductor 252. If the first terminals 41, 42 and 46 are busy, and if the first terminals 31, 32 and 45 of the level of the banks 27, 28 and 29 being contacted also are busy, the sleeve terminal 46 is previously grounded to reenergize the relay 96 through contacts 231 and 232 of the relay 91, a conductor 275, contacts 234 and 235 of the relay 95, conductors 236, 237 and 238, the contacts 206 of the magnet 102, conductor 205, contacts 173, a conductor 239, the winding 181 and the grounded battery 182. The relay 96 pulls up fast and reenergizes the rotary stepping magnet 102 to again step the shaft 60 one terminal space.

If the sleeve conductor 17 connected to the first terminal 45 of the level were not grounded, thereby indicating that the trunk 16 were idle, the advance test wiper 71 does not ground the battery side of the winding 241 of the relay 91, and it is operated by the battery 94. It pulls up as the rotary magnet 102 steps the wipers 61, 62, 63, 64, 65, 66 and 71 to the next terminals of the level. As the relay 91 pulls up, it opens contacts 231 and 232, 261 and 262 and 263 and 264 to the wipers 66, 65 and 64, respectively, to prevent connecting operation of these wipers, opens contacts 265, closes contacts 266 and 267. The relay 91 also closes contacts 261 and 268, 263 and 269 and 232 and 270 to connect in the lagging wipers 61, 62 and 63, which lag one terminal space behind the wipers 64, 65, 66 and 71 and now engage the first terminals 31, 32 and 45. The contacts 267 lock in the relay 91 to ground.

Then, assuming that, in the short period of time between the contact of the trunk 16 by the advance test wiper 71 and the contact of that trunk by the wipers 61, 62 and 63, the trunk was not seized by another selector switch competing with the switch 10, the switch 10 seizes this idle trunk since then the advance test wiper 71 and the contact 45 are not at ground potential and there is no ground from the sleeve wiper spring 63 and the contact 45 to the bottom end of a winding 280 of the relay 95. The winding 280 of the relay 95 is energized by the battery 182 through the winding 181 of the relay 96, the conductor 239, contacts 173, conductor 205, contacts 206, conductors 238, 237 and 225, the winding 280, conductors 226 and 285, contacts 286 and 287 of the springs 100 and conductors 288, 189, 188 and 187 and contact 151 of the relay 98 to ground. An alternate holding circuit to ground from the winding 280 of the relay 95 includes conductors 226 and 291, the contacts 266 of the relay 91, conductor 292, the contacts 201 of the relay 96 and conductors 293, 188 and 187 and contact 151 of the relay 98 to ground. The relay 95 closes contacts 124 and 295, 125 and 296, 234 and 297, and opens contacts 123 and 124, 125 and 126, 234 and 235, 148, 249 and 242. The contacts 124 and 125 connect the ring and tip wiper springs 62 and 61 to the ring and tip leads 115 and 114 to complete the connection to the trunk 16 for dialing the next digit to the seized selector switch of the next group of the groups of selector switches 304, and the connector switch 305, on the last digit dialed, connects the station 26 to the station 161.

Assuming that all ten trunks 16 in the upper line bank of the level dialed would be busy, the grounded equivalent sleeve terminal 45 would provide ground through the prestest wiper 71 through the contacts 242 of the relay 95 to short out the winding of the relay 91, which has ground on its other side through the contacts 249 of the relay 95 and the contacts 251 of the eleventh rotary step springs 100. This short would prevent the relay 91 from operating when battery is applied through the resistance 93 and the rotary-off-normal springs 92 after the first rotary step. Thus, the relay 91 would be prevented from operating during the first ten rotary steps and the switch 10 would perform its hunting function in the regular manner over the trunks 12. If in this case all ten trunk terminals 41, 42 and 46 are busy, the switch 10 rotates to the eleventh position. The relay 91 which is a slow-to-operate relay, will be prevented from operating in that position by the removel of ground by opening of the contacts 251 of the eleventh rotary step springs 100 and the shunting ground from the advance or pretest wiper 71 will have been removed in the eleventh position, then busy tone will be provided in from a busy tone source 321 through conductors 322, contacts 265 of the relay 91, conductors 323 and 324, contacts 325 and 130 of the springs 100, conductors 129 and 127, contacts 126 and 125 and the conductors 114 and 119.

Whenever the terminals 41, 42 and 46 are busy at any horizontal step and the corresponding terminals 31, 32 and 45 are not busy, the relay 96 will be reoperated and relocked for another rotary step from grounded terminal 46 of the busy line in the bank 27. However, before the rotary step occurs, the wiper 71 resting on an idle trunk terminal 45 will not have a shunting ground supplied therefrom and thus will permit the slow-to-operate relay 91 to operate this time from the battery 94 through the resistance 93, the rotary-off-normal springs 92, the winding 241 of the relay 91, contacts 249 of the relay 95 to ground at the contacts 251 of the eleventh rotary step springs 100. The relay 91 will then lock in through its contacts 267 thereof. Release of the relay is under control of the rotary-off-normal springs 92. The relay 91 disconnects the wipers 64, 65 and 66 and connects the wipers 61, 62 and 63 to the conductors 230, 128 and 275 so that when the rotary step now takes place these wipers will re-test and seize the trunk 16 already pretested by the advance test wiper 71 since they are one step behind the position of the wipers 64, 65, 66 and 71.

Assuming next that all ten trunks 12 in the level are busy but only the first nine trunks 16 are busy, the relay 91 will operate and lock up, as described above, due to the idle and ungrounded terminal 45 in the tenth position of the level, just prior to the eleventh rotary step. The operated relay 91 disconnects busy tone 321 through its contacts 265 when the tone is applied through the contacts 325 and 130 of the eleventh rotary step springs 100. The relay 91 will also reconnect, through its contacts 266, the circuit opened at contacts 286 and 287 of the eleventh rotary step springs 100. The connection to the tenth trunk 16 in the level will be completed as above on the eleventh rotary step but will not now be disturbed by the operation of the eleventh-rotary-step springs 100.

Assuming that all twenty trunks 12 and 16 are busy, the relay 91 will have remained unoperated through the tenth and eleventh rotary steps and thus the eleventh rotary step springs 100 become effective in their regular manner to connect the busy signal to the station 26. Where the switch 10 has found all ten trunks 12 to be busy, the tenth trunk 16 to be open and has rotated to the eleventh rotary step position to seize the tenth trunk 16 and that trunk 16 has just been seized by another switch hunting through the level simultaneously under heavy traffic conditions during the interval between the pretest of the tenth trunk 16 by the wiper 71 in the tenth rotary step position and the retest of the same trunk by the wiper 63 in the eleventh rotary step position, the switch 10 will find the tenth trunk 16 busy and establishes an all paths busy condition back to the calling subscriber 26, prevents further rotary stepping, and prevents cut-through of the wipers 61, 62 and 63. These functions are effected as follows: with all the trunks 12 and the first nine of the trunks 16 busy, the switch 10 in the tenth rotary step position operates and locks the relay 96 for the eleventh rotary step and also operates and locks the relay 91 to transfer the conductors 230, 128 and 275 from the wipers 64, 65 and 66 to the wipers 61, 62 and 63. However, if on arriving on the tenth trunk 16, the wiper 63 finds that this trunk had just been seized by another switch during this rotary step, ground on the bank terminal 45 of the trunk 16 reoperates the relay 96 which relocks in the regular manner. The rotary or horizontal stepping magnet 102, however, will not be energized now, since its circuit will be opened at the opened contacts 218 and 219 on the eleventh rotary step springs 100. Also the busy tone from the source 321, even though open at contacts 265 of the operated relay 91, is connected to the station 26 through contacts 202 of the operated relay 96. Also, the operating path for the relay 95, opened at contacts 286 and 287 of the eleventh rotary step springs 100 and closed again at the contacts 266 of the relay 91, is reopened by the contacts 201 of the operated relay 96. Thus, further attempts at rotary stepping are stopped, the calling subscriber will receive the all paths busy signal and the wiper-cut-through relay 95 is prevented from operating. The locking ground 150 to the relay 96 also aids in preventing the operation of the relay 95 under this condition.

In the operation, the advance wiper spring sets 64, 65 and 66 test at each position, and the pretest wiper 71 tests simultaneously therewith. If the wiper spring 66 is contacting an idle trunk, the relay 95 is energized which prevents further operation of the rotary stepping magnet 102. The relay 95 opens contacts 249 to prevent operation of the wiper switching relay 91, and the call goes on to the next one of the selector switches 304.

If the wiper spring 66 is contacting a busy trunk 46, it is grounded thereby to actuate rapidly the relay 96 to actuate the rotary stepping magnet 102. If the pretest wiper 71 is contacting a busy trunk 45, the wiper switching relay 91 is kept grounded on its power side and remains deenergized. But, if the pretest wiper 71 is contacting an idle trunk 45, the trunk 45 being ungrounded removes ground from the power side of the wiper switching relay 91, and the relay 91 starts to pull up. However, since the relay 91 is a slow-to-operate relay, it does not pull up until the fast operating relay 96 and fast operating rotary stepping magnet 102 have operated to step the wiper spring sets to the next position, in which the relay 91 blocks further energization of the rotary stepping magnet 102, and the call goes through the wiper springs 61, 62 and 63 to the next one of the selector switches 304. Since the pretest wiper 71 tests simultaneously with the test by the wiper 66, there is no delay from testing for the second set of wipers, and the rotary stepping operations are not slowed at all even though two testing operations occur at each position.

The above-described system is highly efficient, and utilizes a minimum amount of equipment for a given load. The switches themselves are rugged and compact and require minimum maintenance.

Certain features of the above-described system are disclosed and claimed in my copending application Serial No. 541,005, filed October 17, 1955, for "Telephone Systems."

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a telephone system, a group of trunk lines having terminals, a second group of trunk lines having terminals, a first wiper set for searching over the first group of trunk lines, a second wiper set for searching over the terminals of the second group of trunk lines in synchronism with the first wiper set, circuit means normally rendering the first wiper set operative and the second wiper set inoperative and operable when actuated to render the first wiper set inoperative and the second wiper set operative, a pretest wiper movable over the terminals of the second group of trunk lines one position in advance of the second wiper set, means for moving the wiper sets and the pretest wiper over the terminals of the lines, means operable by the pretest wiper when it engages a terminal of an idle trunk line and the first wiper set engages a terminal of a busy trunk line for actuating the circuit means, and means for stopping searching in either a position in which the first wiper set contacts a terminal of an idle trunk line or one position beyond the position in which the pretest wiper set contacts a terminal of an idle trunk line.

2. In a telephone system, a group of trunk lines having terminals, a second group of trunk lines having terminals, a first wiper set for searching over the terminals of the first group of trunk lines, a second wiper set for searching over the terminals of the second group of trunk lines in synchronism with the first wiper set and one position behind the first wiper set, circuit means normally rendering the first wiper set operative and the second wiper set inoperative and operable when actuated to render the first wiper set inoperative and the second wiper set operative, a pretest wiper movable over the terminals of the second group of trunk lines at the same position as the first wiper set, means for moving the wiper sets and the pretest wiper over the terminals of the lines, means operable by the pretest wiper when it engages a terminal of an idle trunk line and the first wiper set engages a terminal of a busy trunk line for actuating the circuit means, and means for stopping searching in either a position in which the first wiper set contacts a terminal of an idle trunk line or one position beyond the position in which the pretest wiper set contacts a terminal of an idle trunk line.

3. In a telephone system, a group of trunk lines having terminals, a second group of trunk lines having terminals, a first wiper set for searching over the terminals of the first group of trunk lines, a second wiper set for searching over the terminals of the second group of trunk lines in synchronism with the first wiper set, circuit means normally rendering the first wiper set operative and the second wiper set inoperative and operable when actuated to render the first wiper set inoperative and the second wiper set operative, means for moving the wiper sets over the terminals of the lines, means operable when the second wiper set engages a terminal of an idle trunk line and the first wiper set engages a terminal of a busy trunk line for actuating the circuit means, and means for stopping searching in either a position in which the first wiper set engages a terminal of an open trunk line or the position in which the second wiper set engages a terminal of an idle trunk line.

4. In a telephone system, a selector switch having a first wiper set and a second wiper set one position behind the first wiper set, said switch also having a pretest wiper in a rotary position the same as that of the first wiper set, outgoing terminals of trunk lines to which said switch has access, said switch having two trunk groups of terminals connected to the trunk lines, a wiper-shifting relay in said selector switch for normally rendering the first wiper set operative and rendering the second wiper set operative one position later, test means operable by the pretest wiper when the first wiper set is connected to a busy one of the trunk lines, moving means operable by the test means for moving the wiper sets and the pretest wiper until the first wiper set is connected to an idle trunk line, actuating means operable after said moving means is actuated by a busy trunk line for actuating the wiper-shifting relay after the pretest wiper has engaged a terminal of an open trunk line, and means operable by said actuating means for stopping the drive means one position after the pretest wiper has engaged a terminal of an idle trunk line.

5. In a telephone system, a selector switch having a first wiper set and a second wiper set one position behind the first wiper set, said switch also having a pretest wiper in a rotary position the same as that of the first wiper set, outgoing trunk lines to which said switch has access, said switch having two trunk groups of terminals connected to the trunk lines, wiper-shifting relay means in said connector switch for normally rendering the first wiper set operative and rendering the second wiper set operative one position later, stepping means operable by contact of the first wiper set with a terminal of a busy trunk line for stepping the wiper sets and the pretest wiper, and means operable after said stepping means is actuated and the pretest wiper has engaged a terminal of an idle trunk line in one position for actuating the wiper-shifting relay and preventing further operation of the stepping means.

6. A step-by-step switch, which comprises a stepping rotor rotatable in a predetermined direction, a first group of wipers mounted on the rotor, a second group of wipers mounted on the rotor in lagging positions relative to the first-mentioned wipers and offset along the rotor from the first-mentioned wipers, first arcuate groups of trunk terminals contacted by the first-mentioned wipers, second arcuate groups of trunk terminals contacted by the second-mentioned wipers, means for stepping the rotor, means for stopping the rotor-stepping means when the first group of wipers engage idle trunk terminals of the first group, and means for stopping the rotor-stepping means when the second group of wipers engage idle trunk terminals of the second group.

7. A step-by-step switch, which comprises a stepping rotor rotatable in a predetermined direction, a first group of wipers mounted on the rotor, a second group of wipers mounted on the rotor in lagging positions relative to the first-mentioned wipers and offset along the rotor from the first-mentioned wipers, arcuate groups of trunk terminals contactable by the first-mentioned wipers, arcuate groups of trunk terminals contactable by the second-mentioned wipers, means for stepping the rotor, means for stopping the rotor-stepping means when the first group of wipers engage idle trunk terminals of the first group, means for testing each trunk terminal, and a pretest wiper engaging the second group of trunk terminals one step in advance of engagement thereof by the second group of wipers for actuating the stopping means on the next step.

8. A step-by-step switch, which comprises a rotor, means for stepping the rotor, three arcuate rows of trunk terminals, a set of three wipers mounted on the rotor for engaging said trunk terminals, a second three arcuate rows of trunk terminals, a second set of three wipers for engaging the last-mentioned trunk terminals and mounted on the rotor in positions lagging the first-mentioned wipers one position, a pretest wiper mounted on the rotor one position in advance of the second set of wipers for engaging the terminals of one row of the second-mentioned rows of trunk terminals, first test means associated with the first set of wipers for testing and seizing an idle trunk group of the first-mentioned terminals and stopping the rotor-stepping means, second test means associated with the second set of wipers for testing and seizing an idle trunk group of the second-mentioned terminals and stopping the rotor-stepping means, third test means operable by the pretest wiper for testing idle condition of terminals contacted thereby, means operable by the third test means for blocking the first-mentioned testing-and-seizing means when the pretest wiper contacts a terminal of an idle trunk group and stopping the rotor-stepping means after one subsequent step, means operable by the second test means for restarting the rotor-stepping means after said subsequent step if the last-mentioned trunk group of terminals becomes busy during said subsequent step, and means for preventing operation of the third test means in any position in which the first set of wipers engage idle trunk terminals prior to any actuation of the third test means.

9. A step-by-step switch, which comprises a rotor, means for stepping the rotor, three arcuate rows of trunk terminals, a set of three wipers mounted on the rotor for engaging said trunk terminals, a second three arcuate rows of trunk terminals, a second set of three wipers for engaging the last-mentioned trunk terminals and mounted on the rotor, a pretest wiper mounted on the rotor one position in advance of the second set of wipers for engaging the terminals of one row of the second-mentioned rows of trunk terminals, means associated with the first set of wipers for testing and seizing an idle trunk group of the first-mentioned terminals and stopping the rotor-stepping means, means associated with the second group of wipers for testing and seizing an idle trunk group of the second-mentioned terminals and stopping the rotor-stepping means, a third testing means operable by the pretest wiper for testing idle condition of terminals contacted thereby, means operable by said third testing means for blocking the first-mentioned testing-and-seizing means when the pretest wiper contacts a terminal of an idle trunk group and stopping the rotor-stepping means after one subsequent step, means operable by the last-mentioned means for restarting the rotor-stepping means after said subsequent step if the last-mentioned trunk group of terminals becomes busy during said subsequent step, and means for preventing operation of the third testing means in any position in which the first group of wipers engage an idle trunk group prior to any actuation of the third testing means.

10. In a telephone system, a group of trunk lines having terminals, a second group of trunk lines having terminals, a first wiper set for searching over terminals of the first group of trunk lines, a second wiper set for searching over the terminals of the second group of trunk lines in synchronism with the first wiper set, relay means normally rendering the first wiper set operative and the second wiper set inoperative and operable when actuated to render the first wiper set inoperative and the second wiper set operative, a pretest wiper movable over the terminals of the second group of trunk lines one position in advance of the second wiper set, means for moving the wiper sets and the pretest wiper over the terminals of the lines, means operable by the pretest wiper when it engages an idle trunk line and the first wiper set engages a busy trunk line for actuating the relay means, means for stopping the moving means, means operable by the first wiper set when it is in a position contacting a terminal of an idle trunk line for actuating the stopping means in said last-mentioned position, and means operable by the pretest wiper for actuating the stopping means one position beyond that in which the pretest wiper has engaged a terminal of an idle trunk line.

11. In a telephone system, a group of trunk lines having terminals, a second group of trunk lines having terminals, a first wiper set for searching over the terminals of the first group of trunk lines, a second wiper set for searching over the terminals of the second group of trunk lines in synchronism with the first wiper set, relay means normally rendering the first wiper set operative and the second wiper set inoperative and operable when actuated to render the first wiper set inoperative and the second wiper set operative, a pretest wiper movable with the wiper sets over the terminals of the second group of trunk lines one position in advance of the second wiper set, stepping means for moving the wiper sets and the pretest wiper over the terminals of the lines, actuating means operable by the pretest wiper when it engages a terminal of an idle trunk line and the first wiper set engages a terminal of a busy trunk line for actuating the relay means and setting up the stepping means to stop at the next position, means operable by the first wiper set when it is in a position contacting a terminal of an idle trunk line for stopping the stepping means in said last-mentioned position, and means operable by the first wiper set when it is in a position contacting a terminal of an idle trunk line for preventing operation of said actuating means.

12. A connector switch, which comprises a pair of groups of trunk terminals, a first wiper set movable over one of the groups of trunk terminals, a second wiper set movable over the other group of trunk terminals, stepping means periodically operable to move the wiper sets over the trunk terminals, a pretest wiper movable by the stepping means one position in advance of said first wiper set and over the same group of trunk terminals as said first wiper set, testing and seizing means for rendering the second wiper set operative to test and seize an idle trunk terminal, testing means operable by engagement of the pretest wiper with an idle trunk terminal in a position in which the second wiper set engages a busy trunk terminal for blocking the testing and seizing means, and means operable by said testing means for causing the first wiper set to seize the next trunk terminal beyond that which the first wiper set engages when said testing means is actuated.

13. In a step-by-step telephone system, a first group of trunk contact banks, a second group of trunk contact banks, a first wiper set, a second wiper set, a pretest wiper, a rotary magnet for stepping the first wiper set over the first group of contact banks and the second wiper set over the second group of contact banks, said rotary magnet also serving to step the pretest wiper over the second group of contact banks one step in advance of the second wiper set, relay means operable by the first wiper set when engaged with a busy contact of the first group of trunk contact banks for actuating the rotary magnet, a telephone set, and a wiper switching relay operable by the pretest wiper when in contact with an idle line for switching the telephone set from the first wiper set to the second wiper set and blocking actuation of the rotary magnet after the rotary magnet has stepped the wiper sets and the pretest wiper one position ahead.

14. In a step-by-step telephone system, a first group of trunk contact banks, a second group of trunk contact banks, a first wiper set, a second wiper set, a pretest wiper, a rotary magnet for stepping the first wiper set over the first group of contact banks and the second wiper set one step behind the first wiper set over the second group of contact banks, said rotary magnet also serving to step the pretest wiper over the second group of contact banks one step in advance of the second wiper set, relay means operable by the first wiper set when engaged with a busy contact of the first group of trunk contact banks for actuating the rotary magnet, a telephone set, and a wiper switching relay operable by the pretest wiper when in contact with an idle line for switching the telephone set from the first wiper set to the second wiper set and blocking actuation of the rotary magnet after the rotary magnet has stepped the wiper sets and the pretest wiper one position ahead.

15. In a step-by-step telephone system, a first group of trunk contact banks, a second group of trunk contact banks, a first wiper set, a second wiper set, a pretest wiper, a rotary magnet for stepping the first wiper set over the first group of contact banks and the second wiper set over the second group of contact banks, said rotary magnet also serving to step the pretest wiper over the second group of contact banks one step in advance of the second wiper set, relay means operable by the first wiper set when engaged with a busy contact of the first group of trunk contact banks for actuating the rotary magnet, a telephone set, a wiper switching relay operable by the pretest wiper when in contact with an idle line for switching the telephone set from the first wiper set to the second wiper set and blocking actuation of the rotary magnet after the rotary magnet has stepped the wiper sets and the pretest wiper one position ahead, rotary-off-normal spring means for setting up and energizing circuit to the wiper switching relay, and means operable by the pretest wiper serving to prevent actuation of the wiper switching relay when the pretest wiper engages a busy contact of the second group of contact banks.

16. In a step-by-step telephone system, a first group of trunk contact banks, a second group of trunk contact banks, a first wiper set, a tip wiper, a ring wiper and a test wiper, a second wiper set having a tip wiper, a ring wiper and a sleeve wiper, a pretest wiper, means for stepping the first wiper set over the first group of contact banks and the second wiper over the second group of contact banks, the stepping means also serving to step the pretest wiper over the second group of contact banks one step in advance of the second wiper set, means operable by the first wiper set when engaged with a busy contact of the first group of trunk contact banks for actuating the stepping means, means for testing for idle contacts in the groups of contact banks simultaneously with the test wiper and the pretest wiper, means for giving priority to one of the pretest wipers and the test wiper in each position, a telephone set, and a wiper switching relay operable by the pretest wiper when in contact with an idle line for switching the telephone set from the first wiper set to the second wiper set and blocking actuation of the stepping means after the rotary magnet has stepped the wiper sets and the pretest wiper one position ahead.

17. An automatic two-motion switch, which comprises a pair of superposed contact banks, a first set of wipers movable over contacts of one bank, a second set of wipers movable over the contacts of the other bank, a pretest wiper movable one step in advance of the second set of wipers, means responsive to contact of idle contacts by the pretest wiper for switching from the first set of contacts to the second set of contacts, and rotary-off-normal springs for setting up the switching means for actuation by the pretest wiper.

18. In a telephone switching system, a first group of trunk terminals, a second group of trunk terminals, a first contact means for sequentially sensing an idle condition in the first group of trunk terminals, a second contact means for sequentially sensing an idle condition in the second group of trunk terminals, means for simultaneously advancing both contact means over the associated groups of trunk terminals, a calling circuit, means for connecting the calling circuit to the first contact means, auxiliary contact means for sensing an idle condition in the second group of trunk terminals prior to the second contact means, and means operated by the auxiliary contact means sensing an idle trunk terminal for switching said connecting means from the first contact means to the second contact means.

19. In a telephone switching system, a first group of trunk terminals, a second group of trunk terminals, a first contact means associated with the first group of trunk terminals, a second contact means associated with the second group of trunk terminals, means for simultaneously advancing both said contact means to sense an idle condition in the associated groups of trunk terminals, means for stopping said advancing means, means actuated by either said first or second contact means sensing an idle trunk for operating said stopping means, a calling circuit, switching means for connecting said calling circuit to said first contact means, an auxiliary contact means for sensing said second group of trunk terminals prior to said second contact means, and means operated by said auxiliary contact means sensing an idle channel for actuating said switching means to connect the calling circuit to said second contact means.

References Cited in the file of this patent

UNITED STATES PATENTS

| | | |
|---|---|---|
| 1,922,192 | Bellamy | Aug. 15, 1933 |
| 2,028,689 | Saxby | Jan. 21, 1936 |
| 2,504,755 | Taylor et al. | Apr. 18, 1950 |